Nov. 26, 1940.    R. J. BURROWS ET AL    2,222,603
TRUCK AXLE
Filed Dec. 9, 1937    2 Sheets-Sheet 1
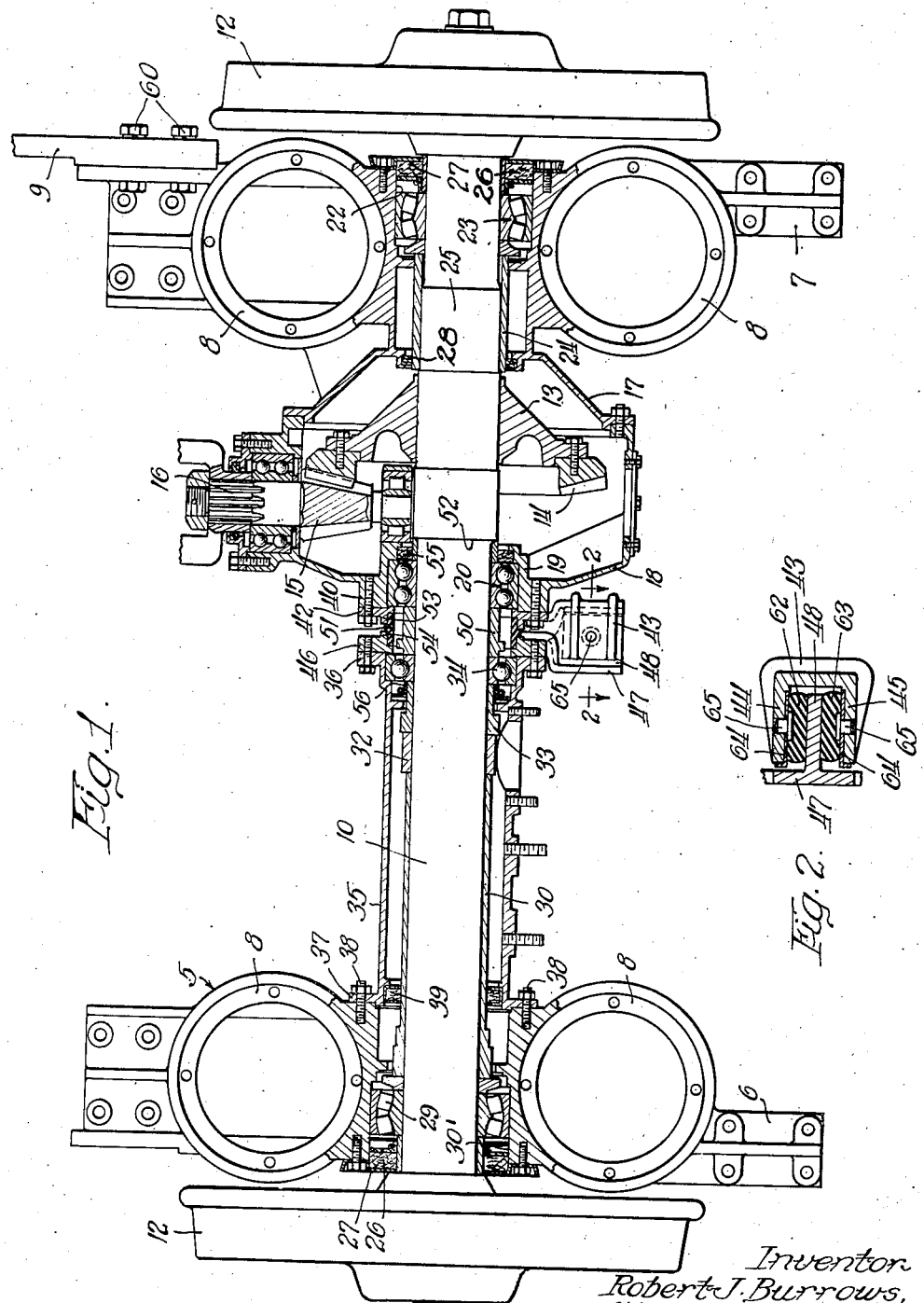
Inventor
Robert J. Burrows,
Alfred O. Williams
By Walter E. Schirmer
Atty.

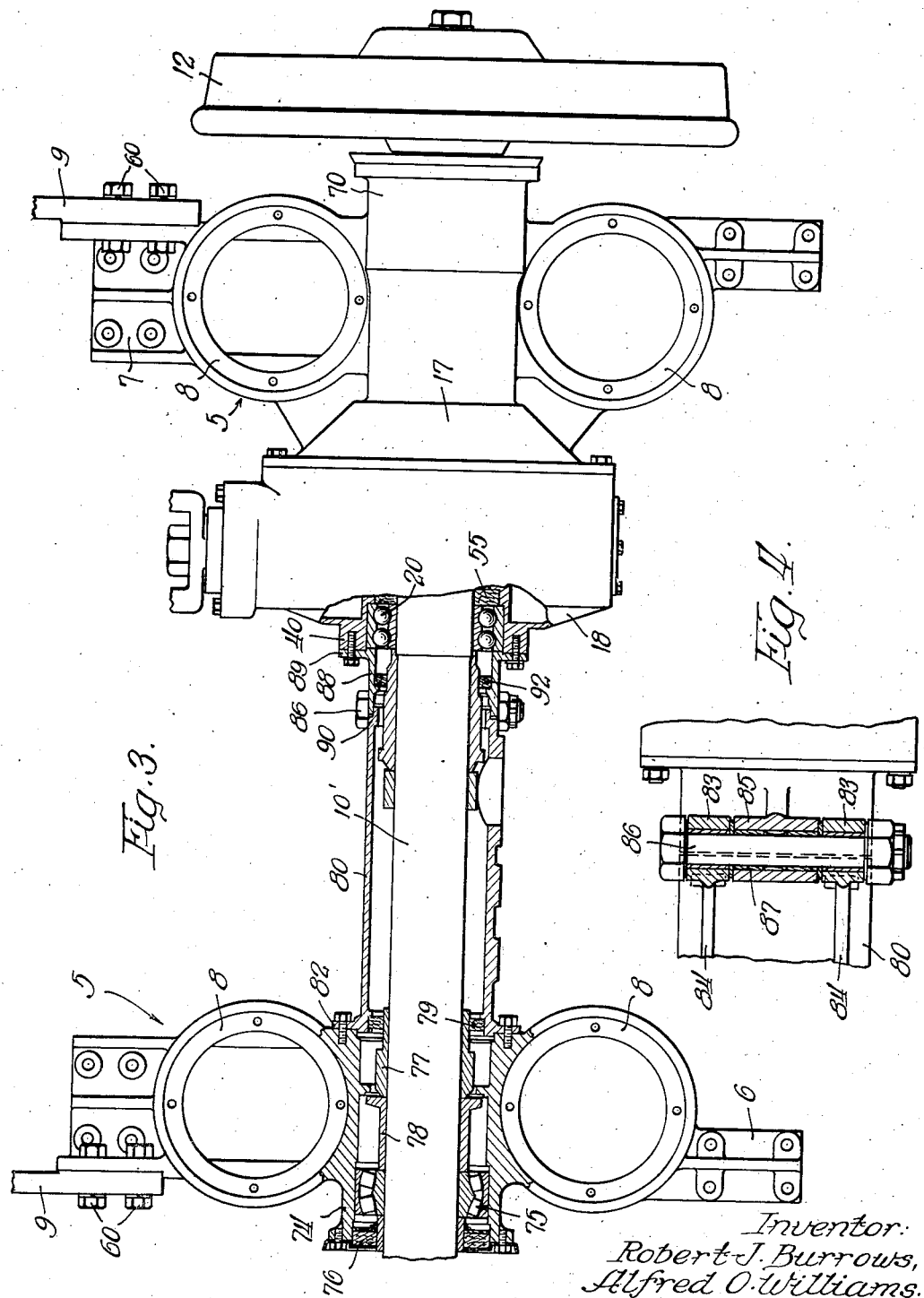

Patented Nov. 26, 1940

2,222,603

UNITED STATES PATENT OFFICE 2,222,603

TRUCK AXLE

Robert J. Burrows and Alfred O. Williams, Battle Creek, Mich., assignors to Clark Equipment Company, Buchanan, Mich., a corporation of Michigan Application December 9, 1937, Serial No. 178,925

6 Claims. (Cl. 105—117)

This invention relates to truck axles, and more particularly to axles of this type used on street cars, rail cars and other rail vehicles.

We have found that the relatively high speeds at which such vehicles travel under present circumstances have placed a severe strain on the journal bearings of the axle by which the truck is supported on the axle shaft.

Those companies engaged in the operation of such vehicles consider the failure of an axle shaft the most serious and hazardous failure that can occur in the operation of such vehicles, and are willing to sacrifice other parts of the mechanism in order to prevent axle breakage on account of extremely high hazard to both life and property which may result from such failures.

In the majority of the constructions with which we are familiar it has been customary to provide a solid transverse axle shaft which, at the outer extremities, supports the wheels and which is mounted for rotation in suitable journal bearings disposed adjacent the wheels and carried within a continuous sleeve or housing that extends completely across the axle. This is especially true in the case of drive axle assemblies such as are used on streetcars, and the driving cars of rail trains and the like. With such a construction the failure of a journal bearing adjacent either wheel results in the shaft being no longer supported by the rollers of such a bearing and the load at this end of the shaft is carried by the shaft which is stressed as in a cantilever beam. The bending moment of such a beam increases under the load and becomes a maximum adjacent the point of support at the thrust bearing adjacent to the ring gear. As a result, the shaft fails under such stresses, and breakage of the shaft occurs which may result in derailment of the vehicle, overturning of the same, and the other serious hazards which occur must be avoided if at all possible.

We have conceived of eliminating possibility of failure of the axle shaft by a design in which the enclosing housing within which the shaft is rotatably mounted is made in two groups which are entirely separate adjacent some intermediate point along the shaft. At the point of separation, suitable sealing means is provided for preventing leakage of lubricant, and to provide for access and lubrication of the center ball bearings. With such a construction the load on either of the wheels in case of a journal bearing failure adjacent the wheel results in downward movement of that section of the housing adjacent the wheel without imparting any bending moment to the shaft itself. Even if the journal bearings adjacent the wheel were entirely demolished, the center ball bearing adjacent to two split portions of the housing sections is relieved of its load and consequently does not stress the shaft in bending due to the fact that the two separate housings will assume a relative angular position, thereby saving from failure both the ball bearing and the axle shaft.

We have considered that the recondite cause of failure of previous axle designs has been the provision of a stiff, one-piece housing assembly within which the axle shaft was mounted. By dividing this assembly into two sections it is apparent that any one of the four supporting or journal bearings on the shaft may fail, allowing the two housing sections to assume an angular position without imparting any effective bending moment into the shaft.

We have also found that some provision must be made for torque reactions due to braking or transmission of drive through both sections of the housing, and since in the usual truck construction a torque arm is provided only adjacent one end of the axle shaft, we have devised certain novel means for transmitting the torque reactions from the adjacent housing section to the remote housing section. This is preferably accomplished by means of a resilient connection which resists movement in either direction of rotation but yet so joins the housing that they are flexible in relation to each other.

The present construction also possesses the advantage of being economical in design and may be easily assembled and disassembled for inspection and repair.

Other objects and advantages of the present invention will appear more fully from the following detailed description, which, taken in conjunction with the accompanying drawings, will disclose to those skilled in the art the particular construction and operation of a preferred form of the present invention.

In the drawings:

Figure 1 is a plain view of a portion of a truck of a rail vehicle with certain parts shown in horizontal section to disclose the details of the axle construction;

Figure 2 is a sectional view taken substantially on line 2—2 of Figure 1;

Figure 3 is a view corresponding to Figure 1 of a modified form of the construction; and Figure 4 is a detail view of a portion of the structure shown in Figure 3.

Considering now in detail the embodiment of the invention disclosed in Figures 1 and 2, we have provided a truck structure, indicated generally at 5, which includes the longitudinally extending portions 6 and 7, which support the body load upon the axle and which preferably are provided with suitable spring sockets 8 receiving the relatively heavy coil springs by which the body is supported upon the truck. Secured to the member 7 is a torque arm 9 which extends longitudinally of the truck, and which serves to transmit braking torque from this portion of the truck to the portion adjacent the opposite axle. Extending through the housing or truck frame 5 is the solid axle shaft 10 which, adjacent its outer ends, is adapted to receive the car wheels 12 securely mounted thereon and engaging suitable rails upon which the vehicle is to travel. The shaft 10 intermediate its ends is adapted to have pressed thereon the sleeve member 13 which has a radially extending flange portion adapted to form a suitable pilot for the ring gear 14. This ring gear 14 is adapted to be driven from a pinion gear 15 carried upon the pinion shaft 16, which may be coupled in any suitable manner to a prime mover such as a Deisel engine, electric motor or any other driving mechanism. The portion 7 of the housing is provided with a bell-shaped flange 17 which, about its periphery forms a suitable pilot for the housing member 18 which encloses the driving gear mechanism, and which is provided with a suitable axial recess 19 forming a retaining seat for the double ball bearing 20 whereby the housing 18 is supported upon the shaft 10. The details of the bearing mounting for the pinion shaft 16 are not pertinent to the present invention and therefore it is not believed necessary to describe the same in detail.

Adjacent the spring supports 8 of the housing section 7 there is provided a recess 22 within which is disposed a double tapered bearing assembly 23 by which this section of the housing is rotatably supported upon the end of the axle shaft. A suitable sleeve 24 is pressed upon the enlarged portion 25 of the axle shaft, and serves as a retaining means for holding the inner race of the double bearing assembly 23 against inward movement. Suitable sealing means 26 is provided in the end of the recess 22 outwardly of the bearings 23 for retaining lubricant therein, and is maintained in position by means of a cover plate 27 bolted to the outer face of the housing section 7. Similar sealing means 28 is provided adjacent the small end of the bell-shaped flange 17, and serves to maintain lubricant from escaping into the flanged section 17 and driving gear housing 18. Thus, the lubricant for the bearings 23 is mainained separate from the lubricant within the housing 18.

At the opposite end of the shaft 10 a similar bearing assembly 29 is provided within the recess 30' for rotatably supporting the shaft 10 at this end within the housing section 6. Corresponding sealing means 26 is disposed in the outer end of the recess 30' and maintained in position by means of the cover plate 27 in the same manner as previously described.

A tubular sleeve member 30 is seated over the shaft 10 axially inwardly of the bearings 29, and serves to maintain these bearings in predetermined position against axial movement. At its opposite end the sleeve member 30 engages a suitable bearing sleeve 32, which in turn locates the bearing retaining sleeve 33 in position for locating the bearings 20 carried by the housing 18, and the bearing 34 carried at the inner end of the housing sleeve 35 which has its end flanged as indicated at 36 to provide a bearing retaining seat.

The opposite end of the housing sleeve 35 is also flanged as indicated at 37, and is bolted as by means of the studs 38 to the inner face of the housing section 6 to form a rigid connection therewith. Sealing means 39 is carried within the flanged portion 37 of the housing sleeve 35 and prevents passage of lubricant axially along the sleeve 30 from the bearings 29.

Bolted to the axially extending boss 40 of the housing member 18 is an arm 42 which has a cylindrical portion piloted in the end of the boss 40 and serving as a retaining member for the outer race of the bearing assembly 20. The arm 42 has a lateral projection terminating in a U-shaped portion 43 having the parallelly spaced arms 44 and 45 as indicated in detail in Figure 2. Similarly, the flanged portion 36 of the housing sleeve 35 has bolted thereto an arm 46 which has the cylindrical portion thereof piloted in the end of the sleeve 35 to form a retaining means for the outer race of the bearing assembly 34, and which is provided with a laterally projecting arm portion 47 of T-shaped section having the normally extending flange portion 48 projecting into the U-shaped portion 43 of the arm 42 between the parallel spaced portions 44 and 45. Disposed on the shaft 10 between the housing sleeve 35 and the boss portion 40 of the housing 18 is a bearing locating sleeve 50 which locates the inner races of the bearing assemblies 20 and 34 with respect to the shoulder 52 on the shaft 10.

Radially outwardly of the sleeve 50 and suitably secured in the axially flanged portions 53 and 54 of the arms 42 and 46 is a rubber sleeve 51 which is inserted between these two members under pressure and serves as a lubricant retaining seal between the bearings 20 and 34 to prevent loss of lubricant between the housing section comprising the frame portion 6 and housing sleeve 35, and the section comprising the frame portion 7 and the housing member 18. Suitable sealing means 55 is provided in the recessed portion 19 of the housing 18 to prevent passage of lubricant from the bearing assembly 20 into the housing 18. Similarly, a suitable sleeve 56 is provided within the flanged end 36 of the housing sleeve 35 to prevent passage of lubricant from the bearing assembly 34 into the housing sleeve 35.

It will be apparent that with the arrangement thus far described, failure of the bearing assembly 29 will not result in placing an undue bending stress upon the shaft 10, since it will merely result in an angular displacement of the housing section comprising frame 6 and sleeve 35 with respect to the housing section comprising frame 7 and housing 18. This may cause failure of the bearing assembly 34 by cocking, but since it is relieved of radial load, this bearing will not produce any undue stress in the axle shaft which might cause failure of the axle. This will result only in the housing section 6 dropping down on the axle due to the body load carried by the springs in the sockets 8.

Obviously, the failure of the bearings 23 will result in a similar action of the housing section comprising frame 7 and housing 18, and may cause failure of the bearings 20. However, even such failure will not result in breakage of the shaft 10 and will give ample warning of such bearing failure before any possible over-stressing of the shaft itself occurs.

As previously out, only one of the frame sections 6 and 7 is provided with a torque arm in this embodiment of the invention, the section 7 having the torque arm 9 secured thereto by means of the bolts 60. In order that the torque reactions due to breaking or driving through either one of the housing sections can be transmitted to both halves of the complete housing, we have provided the arms 42 and 46 which have their projecting portions 43 and 47 so disposed so as to be in overlapping relationship. Secured between the flange 48 of the arm section 47 and the arm portions 44 and 45 of the arm 42 are resilient cushioning members comprising the resilient biscuits 62 and 63 which have one surface thereof in contact with the faces of the flange 48 and have the opposite surfaces vulcanized to the plates 64. Extending through each of the plates 64 is a stud 65 which projects into suitable aligned openings in the arms 44 and 45. This locates the biscuits 63 and 62 in position and prevents relative displacement thereof due to possible relative rotation caused by braking or driving forces between the arms 42 and 46.

With the connection as shown in Figure 2, the housings are flexible with respect to each other by reason of the resilient sleeve 51 and the cushioning members 62 and 63 between the arms 42 and 46. Thus, the housings can assume relative angular positions with respect to each other due to failure of the axle shaft bearings, and yet are coupled together for the transmission of the torque reactions due to driving or braking to both halves of the housing.

In the embodiment of the invention shown in Figures 3 and 4, a slightly modified construction is employed in which one of the axle bearings has been eliminated, and the radial and torque loads are taken entirely by a cross pin secured between the two housing sections. Similar reference numerals indicate similar parts in the two constructions.

Considering in detail the embodiment of the invention shown in Figures 3 and 4, the axle shaft 10' has mounted on the ends thereof the car wheels 12 by which the axle is supported on the rails. The frame section 7 in this embodiment of the invention is provided with an axially outwardly extending flange portion 70 in which is located the bearing assembly. Sealing means is provided as described in connection with Figures 1 and 2.

Similarly, the housing section 6 is provided with an axial outward extension 74 containing the double tapered bearings 75 and the sealing means 76. A suitable sleeve 77 pressed on the axle shaft serves to locate the inner race of the bearings by abutting engagement with the bearing locating sleeve 78. Sealing means 79 is provided for sealing the interior of the journal portion of the frame section 6 against axial inward movement of lubricant.

Piloted in the inner face of the frame section 6 is a housing sleeve 80 which has the flange portion 82 bolted to the inner face of the section 6 and suitably recessed internally to maintain the sealing means 79 in position. Adjacent its opposite end the sleeve 80 is provided with laterally offset spaced journal portions 83 connected to the surface of the sleeve 80 by means of the reinforcing ribs 84. Between the two journal portions 83 of the sleeve 80 there is disposed a collar 85 and a suitable cross pin 86 extends through the journals 83 and collar 85 and serves to hold the same against relative movement. Preferably, a bronze bearing sleeve 87 is provided within the journals 83 and 85 about the pin 86 so that relative rotation of the journals 83 with respect to the journal or collar 85 can be accommodated. The collar 85 is formed integral with a sleeve member 88 having the radial flange 89 bolted to the end face 40 of the housing 18. The sleeve 88 has its defining edge piloted in the end 90 of the sleeve 80 and suitable sealing means 92 is disposed within the sleeve 88 to prevent passage of lubricant to the piloted joint between the sleeve 88 and the end 90 of the housing sleeve 80. In this embodiment of the invention only one central bearing is provided, but it will be apparent that by reason of a cross pin connection, the housing section comprising frame member 6 and housing sleeve 80 can rotate about the pin 86 relative to the housing section comprising frame 7 and housing 18 in case of failure of the bearings 75 without in any way placing an undue stress upon the shaft 10' which might tend to cause failure thereof.

Similarly, failure of bearings 23 may result in dropping of the frame section 7 down upon the adjacent end of the shaft 10' but will not stress the shaft as a cantilever beam due to the flexible connection 90 between the two halves of the housing.

The torque reactions due to braking and driving are transmitted to both housing sections through the cross pin 86 in the same manner as the reactions in the structure shown in Figures 1 and 2 are transmitted by reason of the connection by the arms 42 and 46.

It will thus be apparent that we have provided a construction in which the housing sections are formed in two groups which are so connected as to allow limited angular displacement therebetween due to failure of the journal bearings without in any way imparting undue bending stresses of the axle shaft itself. In spite of this relatively flexible connection between the two housing sections so far as axial displacement is concerned, we have provided for connection of these sections against relative rotation in order that the torque reactions due to braking and driving will be transmitted to both sections. Also, our present construction prevents any loss of lubricant which is maintained in the bearings and driving means by which the axle is rotated, and the sealing means of the present invention functions to prevent escape of this lubricant even in the event of damage to the bearings.

We are aware that various changes and modifications may be made in certain details of construction of various portions of our structure without departing from the underlying principles of the present invention, and we therefore do not intend to limit our invention except as defined by the scope and spirit of the appended claims.

We claim:

1. In an axle assembly for a rail vehicle truck, a truck frame portion having two housing sections extending transversely thereacross, a continuous one-piece axle shaft extending through both said sections and having wheels at the extremities thereof, said sections substantially enclosing said shaft between said wheels, bearings in said sections for rotatably supporting said shaft adjacent said wheels and at the adjacent ends of said sections, means providing for relative hinging movement between said sections in a vertical plane but maintaining said sections against rotative movement with respect to each other, and means for sealing the joint between the adjacent ends of said housing sections.

2. In an axle assembly, a continuous one piece axle shaft, a pair of axially spaced housing sections through which said shaft extends, bearings for rotatably supporting said shaft disposed adjacent each end of each of said sections, drive means supported in one of said sections for rotating said shaft, means forming a resilient nonmetallic seal between adjacent ends of said sections, and laterally offset interengaged means secured to said adjacent ends of said sections for locking said sections against relative rotative movement but permitting limited vertical hinging displacement therebetween, said locking means comprising an axially directed channel secured to one section and adapted to receive therein an axially directed flange secured to the other section.

3. In an axle assembly, a one-piece axle shaft having wheels secured to the opposite ends thereof, a truck frame supported on said shaft and including two housing sections substantially continuously enclosing said shaft intermediate said wheels, bearing means in said sections rotatably supporting said shaft therein and normally maintaining said sections against relative vertical displacement, one of said sections having a radially enlarged portion for receiving a drive pinion extending normal to said shaft, a ring gear in said portion secured directly to said shaft and driven from said pinion, sealing means at the axial ends of said portion, and means lying in a plane normal to said axle and intermediate said sections for transmitting braking and torque reactions from one section to the other while providing for limited vertical hinging movement between said sections upon destruction of one of said bearing means.

4. In combination, a pair of coaxial housing sections, a one-piece axle shaft extending through both said sections and rotatably supported therein, flanges on the adjacent ends of said sections substantially at the longitudinal center of said shaft, an arm bolted to each said flange and extending normal to said housing, said arms having overlapping tongue and groove engaging portions, and resilient cushioning means secured between said overlapping portions.

5. In a rail truck axle assembly, a pair of coaxial tubular axle housing sections having means for supporting a truck frame thereon and having rabbetted peripheral engagement at their adjacent ends, a one-piece axle shaft extending through both said sections and having wheels secured to the extremities thereof, bearing means supporting said shaft for rotation in said sections, means coupled between and lying in a plane through the adjacent ends of said sections substantially in the longitudinal center of said shaft for maintaining the sections against relative rotation while permitting limited hinging displacement, and sealing means between said bearing means and the coupling means.

6. In a rail truck axle assembly, a pair of coaxial tubular axle housing sections having means for supporting a truck frame thereon, a one piece axle shaft extending through both said sections and having wheels secured to the extremities thereof, said sections having rabbetted peripheral engagement at their adjacent ends substantially at the longitudinal center of the shaft, bearing means supporting said shaft for rotation in said sections, means between the adjacent ends of said sections forming a hinged joint preventing relative rotation of said sections but allowing limited vertical displacement therebetween, and sealing means within said sections between said bearing means and said joint.

ROBERT J. BURROWS.
ALFRED O. WILLIAMS.